United States Patent [19]
Danielsen et al.

[11] Patent Number: 6,093,133
[45] Date of Patent: Jul. 25, 2000

[54] LEARN 1ST 2-3 SHIFT, 1ST N-1 LEARN

[75] Inventors: Mark A. Danielsen, Lake Orion; Hussein A. Dourra, Dearborn Heights; Gerald L. Holbrook, Rochester Hills, all of Mich.

[73] Assignee: DaimlerChrysler Corporation, Auburn Hills, Mich.

[21] Appl. No.: 09/283,567

[22] Filed: Apr. 1, 1999

[51] Int. Cl.[7] ................................ F16H 61/06
[52] U.S. Cl. ............................................. 477/117
[58] Field of Search ............................................. 477/117

[56] References Cited

U.S. PATENT DOCUMENTS

| | | |
|---|---|---|
| 4,270,646 | 6/1981 | Norcross . |
| 4,871,048 | 10/1989 | Chatterjea . |
| 4,875,391 | 10/1989 | Leising et al. . |
| 4,944,200 | 7/1990 | Benford et al. . |
| 4,982,620 | 1/1991 | Holbrook . |
| 4,982,826 | 1/1991 | Holbrook . |
| 5,038,286 | 8/1991 | Asayama et al. . |
| 5,046,174 | 9/1991 | Lentz et al. . |
| 5,058,460 | 10/1991 | Hibner et al. . |
| 5,216,606 | 6/1993 | Lentz et al. . |
| 5,231,898 | 8/1993 | Okura . |
| 5,456,647 | 10/1995 | Holbrook . |
| 5,467,854 | 11/1995 | Creger et al. . |
| 5,518,468 | 5/1996 | Sametz et al. . |
| 5,580,332 | 12/1996 | Mitchell et al. . |
| 5,655,993 | 8/1997 | Fujimoto et al. ........................ 477/117 |
| 5,733,220 | 3/1998 | Iizuka ...................................... 477/117 |
| 5,737,979 | 4/1998 | McKenzie et al. . |
| 5,769,753 | 6/1998 | Kusafuka et al. ........................ 477/117 |
| 5,788,603 | 8/1998 | Tsutsui et al. ........................... 477/117 |
| 5,853,076 | 12/1998 | McKee et al. . |

*Primary Examiner*—Dirk Wright
*Attorney, Agent, or Firm*—Marc Lorelli

[57] ABSTRACT

The present invention provides a means to learn and accommodate the amount of air that needs to be purged from a clutch circuit after being off for a predetermined time. The scheme helps to maintain proper control timing as necessary for good shift quality and clutch durability and further helps to minimize unnecessary delays in clutch application. Once the air has been purged, then normal control timing can be resumed.

14 Claims, 11 Drawing Sheets

| 4WD 4-SPEED ELECTRONIC TRANSMISSION | MANUAL VALVE POSITION | GEAR | TORQUE RATIO | CLUTCHES APPLIED |
|---|---|---|---|---|
| | | REV. | 3.00 | RC, LR |
| | | PARK,NEU. | | LR |
| | | 1ST. | 3.00 | UD, FW, (LR) |
| | | 2ND. | 1.67 | UD, 2C |
| | | 2' | 1.50 | UD, 4C |
| | | DIRECT | 1.00 | UD, OD |
| | | 4TH. | 0.75 | OD, 4C |
| | | 4' | 0.67 | OD, 2C |

UD- UNDERDRIVE CLUTCH
OD- OVERDRIVE CLUTCH
R- REVERSE CLUTCH
4C- 4TH. CLUTCH
2C- 2ND. CLUTCH
LR- LOW-REVERSE CLUTCH
FW- FREE WHEEL
CC- CONVERTER CLUTCH

C- CARRIER ASSEMBLY    A- ANNULUS GEAR    S- SUM GEAR    CC- CONVERTER CLUTCH    FW- FREE WHEEL CLUTCH

*Fig–3A*

LEARN 1ST 2-3 SHIFT, 1ST N-1 LEARN

BACKGROUND OF THE INVENTION

I. Technical Field

The present invention relates generally to an electronically controlled automatic transmission capable of independently learning the fluid fill volumes of its friction elements and, more particularly, to an automatic transmission capable of learning these fill volumes after start up conditions.

II. Discussion

In the present design of automatic transmissions, a series of clutches or friction elements provide a means for application and release of separate members to and from each other during the flow of power through the transmission. These clutches thereby constitute the means by which gears within the transmission are selectively engaged or disengaged from either the engine crankshaft or the transmission case. Four speed transmissions, of the type which this invention is directed, generally include any number of elements or clutches which are applied or engaged in various combinations in relation to each of the vehicles gears.

To apply each of these clutches, an electronically controlled hydraulic actuating device such as a solenoid actuated valve is used. There is typically one valve for each clutch. These valves each control fluid flow to a respective clutch apply cavity. The flow of fluid into a clutch apply cavity results in the application or engagement of that clutch. Fluid is provided to a clutch apply cavity from the transmission's fluid pump. This pump provides the required pressurization to allow fluid flow into the clutch apply cavity. Fluid flow is enabled by the opening of the solenoid actuated valve in response to a command or control signal received by the solenoid from an electronic control system.

The electronic control system typically includes a microcomputer-based transmission control module capable of receiving input signals indicative of various vehicle operating conditions such as engine speed, torque converter turbine speed, transmission output shaft speed (vehicle speed), throttle angle position, brake application, predetermined hydraulic pressures, a driver selected gear or operating condition (PRND2L), engine coolant temperature and/or the ambient air temperature. Based on the information contained in these signals, the controller generates command or control signals for causing the actuation of each of the solenoid/actuated valves which control the application and release of fluid pressure to and from the apply cavities of the clutches or frictional units of the transmission. Accordingly, the controller is programmed to execute predetermined shift schedules stored in a memory of the controller through appropriate command signals to the solenoid-actuated valves.

Typically, transmission fluid is supplied to the clutch apply cavity in two stages. First, the fluid from the pump is supplied to the clutch element by a solenoid actuated valve in a continuous and logically full-on fashion to rapidly pre-fill and stroke the clutch apply piston through a clearance that is established when the clutch is disengaged. This rapid fill rate is maintained until the remaining piston clearance is nearly zero. Next, the solenoid actuated valve undergoes a duty cycle to cyclically allow the fluid to generate an average lower flowrate of fluid to the clutch apply cavity than was provided by the first flowrate. This lower rate causes a softer application of the respective clutch element than would otherwise be associated with the solenoid valve in its previous logically full-on state. However, application of clutch elements in this way has some drawbacks.

While the vehicle engine is running, the transmission fluid pump typically maintains fluid within the transmission fluid circuits up to a predetermined level without significant trapped air. When the vehicle engine is turned off, the pump stops pumping and the fluid level within the transmission fluid circuits can drop below the predetermined level. This fluid is replaced by air. When the engine is subsequently turned back on, the air in the clutch control circuits may not be purged until after the first application of that clutch in a shift. As a result, if the gear shifted into occurs before the air is purged in the respective applying clutch circuit, then additional fluid must replace or compress this air before clutch application can occur. If additional fluid to the respective clutch element is supplied at the lower duty cycle flowrate, then the overall time required to apply the clutch element can be significantly increased. This, in effect, creates a control time lag that can affect shift quality and clutch durability. The present invention was developed in light of these drawbacks.

SUMMARY OF THE INVENTION

The present invention provides a means to learn and accommodate the amount of air that needs to be purged from a clutch circuit after being off for a predetermined time. The scheme helps to maintain proper control timing as necessary for good shift quality and clutch durability and further helps to minimize unnecessary delays in clutch application. Once the air has been purged, then normal control timing can be resumed.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3A is a schematic view of a chart of an automatic transmission according to the present invention;

DETAILED DESCRIPTION OF THE PREFERRED EMBODIMENTS

The following description of the preferred embodiments is merely exemplary in nature and is in no way intended to limit the invention, its application, or uses.

Figure 1:
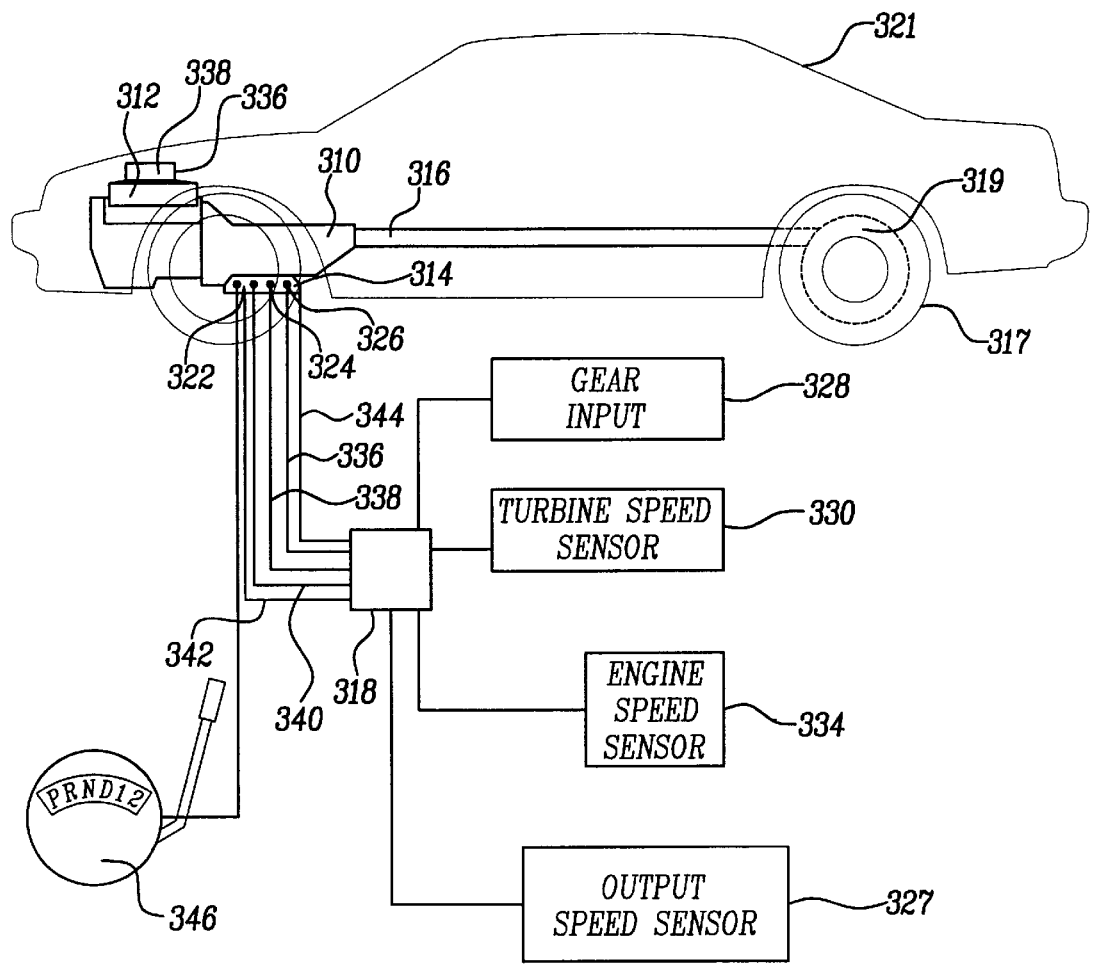
FIG. 1 is a schematic view of a vehicle with an automatic transmission according to the present invention.

Referring now to FIG. 1, an automatic transmission 310 is shown in conjunction with a vehicle 321 having an engine 312 and controlled by a electronic control system 318. Electronic control system 318 has a processor, random access and non-volatile memory, and is adapted to interact as necessary with other vehicle electronic control modules. As shown, electronic control system 318 electrically communicates with a number of sensors to receive signals indicative of engine rotational speed 334, torque converter turbine rotational speed 330, and the gear or operating condition (PRND2L) 328. Each of these signals may be provided by one or more vehicle sensing devices (not shown) as commonly known to those skilled in the art.

Figure 2:
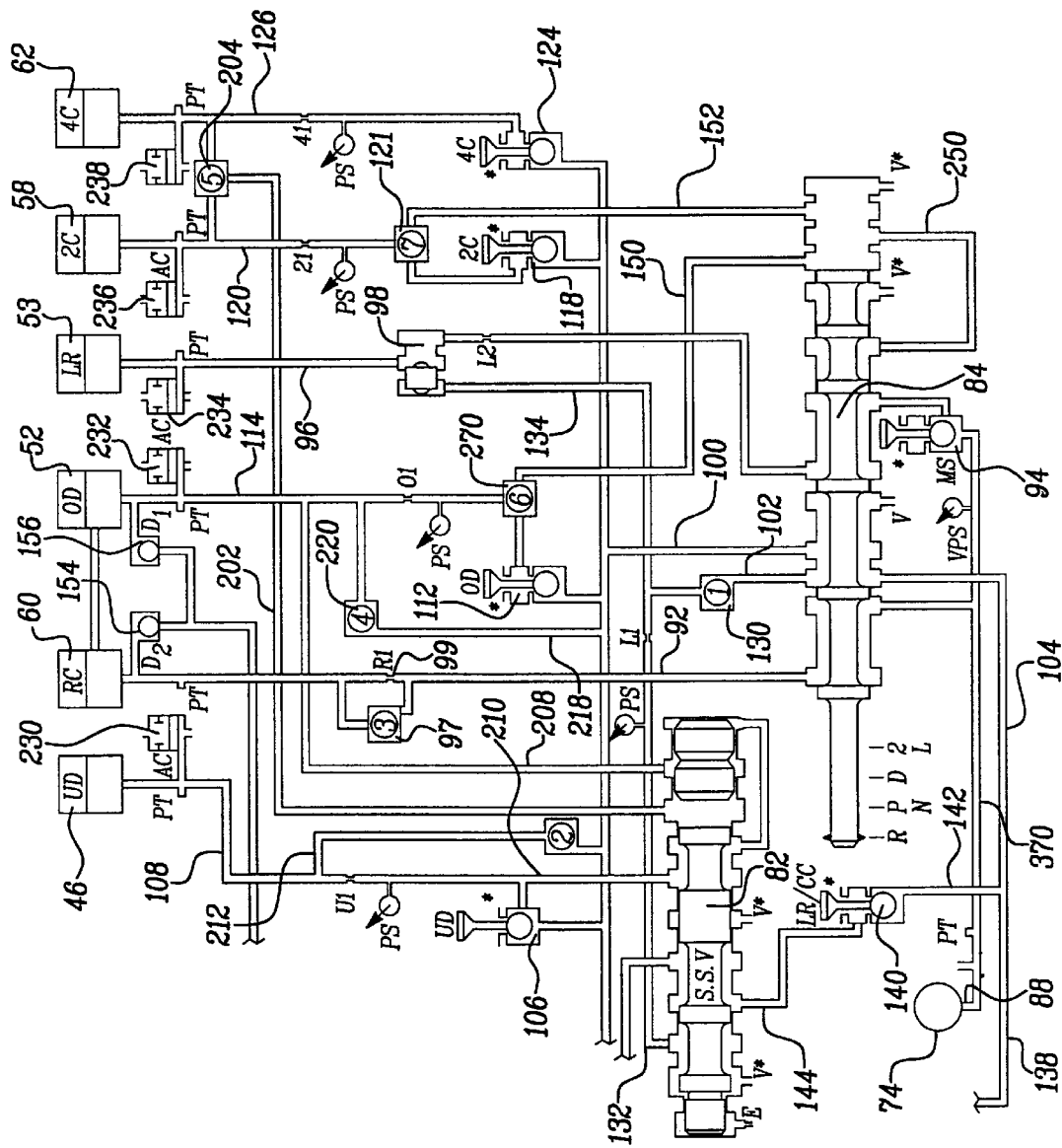
FIG. 2 is a schematic view of a hydraulic circuit of an automatic transmission according to the present invention.

The electronic control system 318 provides an energizing signal to each of a plurality of solenoid actuating valves through electrical circuits 336, 338, 340, 342 and 344. An energizing signal, or the absence of an energizing signal, on electrical circuits 336, 338, 340, 342 and 344 causes the application and release of the associated frictional elements of the system consistent with the control capabilities provided by the hydraulic circuit (FIG. 2). With reference to FIG. 2, these elements are actuated by the underdrive (UD) clutch valve 106, 2nd gear (2C) clutch valve 118, 4th gear clutch valve (4C) 124, overdrive (OD) clutch valve 112 and (MS) clutch valve 94. The mechanical operation of each clutch element will be discussed in greater detail in the upcoming discussion.

Each clutch has an apply (on) and a release (off) position. When a particular clutch is in the on position, it is frictionally engaged to a planetary gear set or other rotating element. Likewise, when a clutch is in a off position, it is released, allowing its associated rotational element to freely rotate. The on position may be accomplished by using the shift lever 346 or the 2C 118, OD 112, UD 106, 4C 124 or MS 94 solenoid-actuated valves to either apply or remove hydraulic pressure, depending on the particular clutch being applied.

Figure 3:
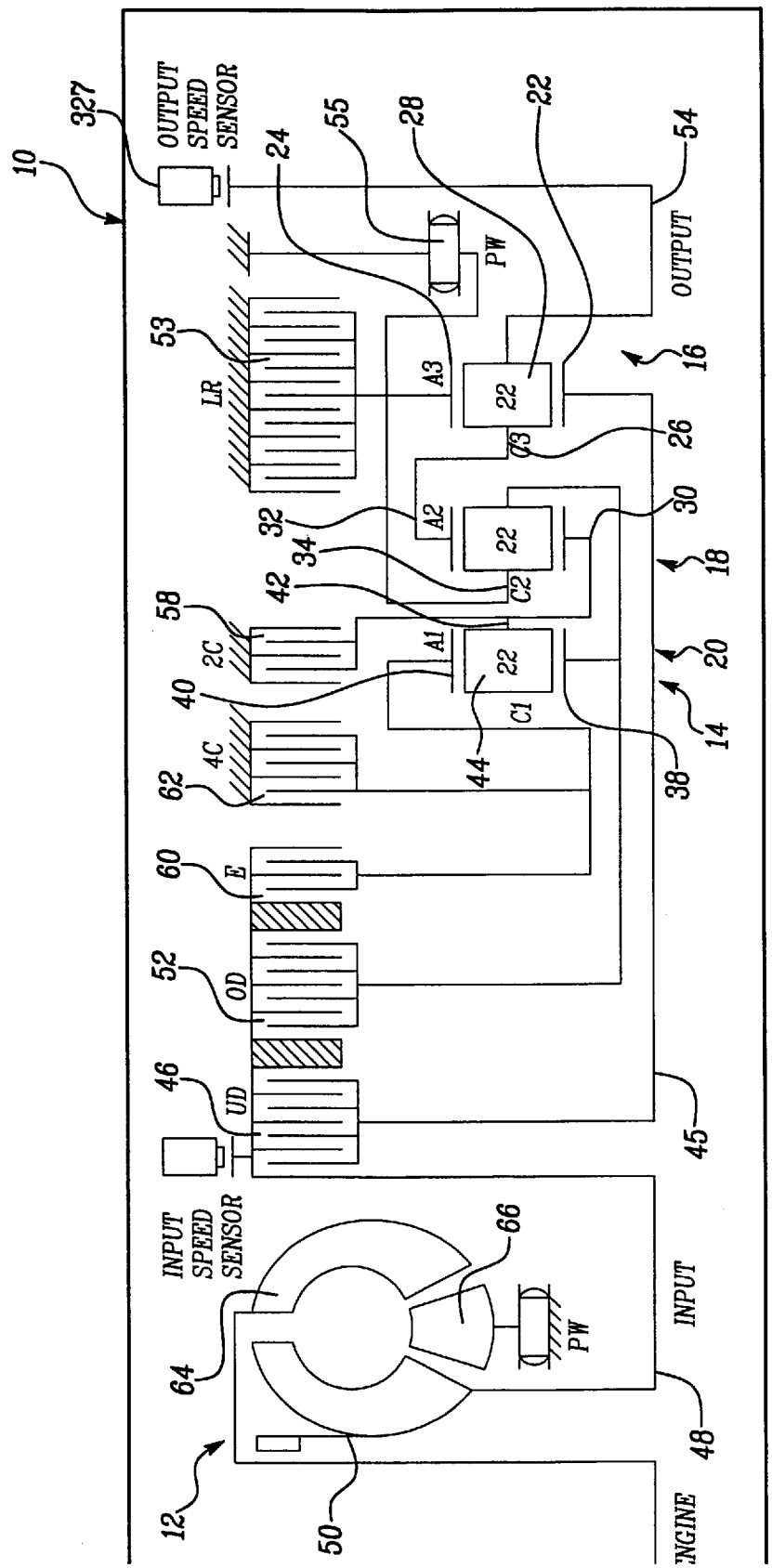
FIG. 3 is a schematic view of an automatic transmission according to the present invention.

With reference to FIG. 3, the automatic transmission 10 includes a torque converter 12 which is operably connected to a multiple planetary gear system 14. The multiple planetary gear system 14 includes a first planetary gear assembly 16, a second planetary gear assembly 18, and a third planetary gear assembly 20. The first planetary gear assembly 16 includes a sun gear 22, an annulus gear 24, a planetary carrier assembly 26, and a plurality of planetary gears 28 rotatably mounted to the planetary carrier 26. The second planetary gear assembly 18 includes a sun gear 30, an annulus gear 32, a planetary carrier 34, and a plurality of planetary gears 36 rotatably mounted on the planetary carrier 34. The third planetary gear assembly 20 includes a sun gear 38, an annulus gear 40, a planetary carrier 42, and a plurality of planetary gears 44 rotatably mounted on the planetary carrier 42.

The sun gear 22 of the first planetary gear assembly 16 is selectively driven by engagement of an UD clutch element 46 with an input shaft 48 which is driven by a turbine 50 of the torque converter 12. The annulus gear 24 of the first planetary gear assembly 16 is attached to the planetary carrier 34 of the second planetary gear assembly 18 which is also attached to the sun gear 38 of the third planetary gear assembly 20. Each of these elements are selectively engaged by an overdrive clutch 52 which engages the annulus gear 24 of first planetary gear assembly 16, the carrier assembly 34 of the second planetary gear assembly 18, and the sun gear 38 of the third planetary gear assembly to the input shaft 48. The planetary carrier 26 of the first planetary gear assembly 16 is attached to an output shaft 54 and is also attached to the annulus gear 32 of the second planetary gear assembly 18. The sun gear 30 of the second planetary gear assembly 18 is attached to the planetary carrier 42 of the third planetary gear assembly 20 which is engagable by a second gear clutch 58 which is engagable to prevent rotation of the carrier 42 and sun gear 30 relative to the transmission housing. The annulus gear 40 of the third planetary gear assembly 20 is engagable by a reverse clutch 60 for selectively engaging the annulus gear 40 with the input shaft 48. In addition, the annulus gear 40 of the third planetary gear assembly 20 is also engagable with a fourth gear clutch 62 for preventing rotation of the annulus gear 40 relative to the transmission housing.

The torque converter 12 includes an impeller 64 which is attached to the engine (not shown). As the engine drives the impeller 64, fluid which is propelled by the blades of the impeller 64 drive the turbine 50 in order to drive the input shaft 48. The stator 66 directs the fluid from the turbine 50 back to the impeller 64 in order to achieve torque multiplication, as is well known in the art.

FIG. 3A illustrates the different operating modes of the automatic transmission, as shown in FIG. 3. In particular, in order to obtain a reverse gear operation, the reverse clutch 60 and low reverse clutch 53 must be applied. In order to obtain a park, neutral position, the low/reverse clutch must be applied. In order to obtain first gear, the UD clutch element 46 and the free wheel clutch 55 or the low/reverse clutch 53 must be applied. In order to obtain second gear, the UD clutch element 46 and second gear clutch 58 must be applied. In order to obtain a second prime ($2^{nd}$) gear, the UD clutch element 46 and fourth gear clutch 62 must be applied. In order to obtain the direct gear ($3^{rd}$), the UD clutch element 46 and overdrive clutch 52 must be applied. In order to obtain fourth gear, the OD clutch element 52 and fourth gear clutch 62 must be applied. In order to obtain a fourth prime gear ($4^{th}$), the OD clutch element 52 and second gear clutch 58 must be applied.

With reference to FIG. 2, the hydraulic control system 70, for selectively engaging the UD clutch element 46, overdrive clutch 52, low/reverse clutch 53, second gear clutch 58, fourth gear clutch 62, and reverse gear clutch 60, will now be described. The hydraulic control system 70 includes a pump 74 which supplies hydraulic fluid to a manual valve 84 via passage 370.

In the reverse "R" position of the manual valve 84, hydraulic fluid is communicated to the reverse clutch 60 via passage 92 and to the low/reverse clutch 53, when the multi-select solenoid 94 is de-energized, via passage 96. A ball check valve 97 is provided in bypass relationship to a restriction 99 in passage 92. A low/reverse switch valve 98 is provided in the passage 96. In order to block a transmission shift to the reverse gear, the transmission controller, in response to a detected vehicle speed which exceeds a predetermined value (for example, 8 mph), holds the multi-select solenoid 94 in the activated condition so that the low/reverse clutch 53 cannot be actuated.

Figure 5:
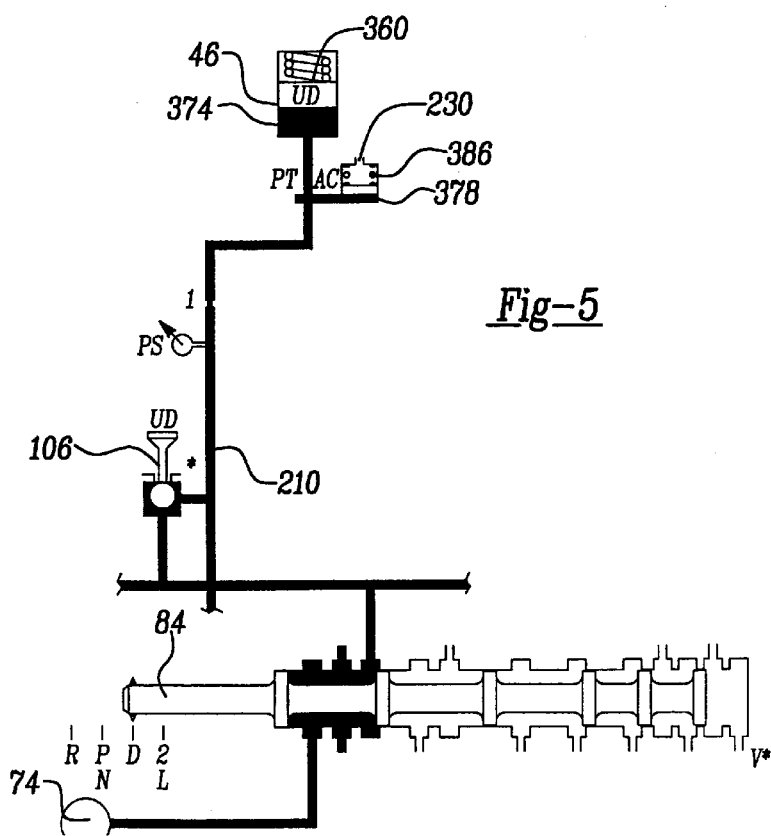
FIG. 5 is a schematic view of a fluid circuit of an automatic transmission according to the present invention.

When the manual valve 84 is in the drive "D" position, hydraulic fluid is delivered to the passages 100, 102, and 104, as shown in FIG. 5. Upon deactivation of the UD clutch solenoid valve 106, hydraulic fluid can be delivered to the UD clutch element 46 from passage 100 via passage 108. By activation of the OD clutch solenoid valve 112, hydraulic fluid can be delivered to overdrive clutch 52 via passage 114. Through actuation of second gear (2C) clutch solenoid valve 118, hydraulic fluid can be delivered to the second gear clutch 58 from passage 100 via passage 120 through dual acting ball check valve 121. By actuating fourth gear (4C) clutch solenoid valve 124, hydraulic fluid can be delivered to the fourth gear clutch 62 from passage 100 via passage 126.

Passage 102 communicates fluid through the ball check valve 130 to the solenoid switch valve 82 via passage 132 and to the low/reverse switch valve 98 via passage 134. Passage 104 delivers hydraulic fluid to a low/reverse torque converter clutch solenoid valve 140. When in the open position, the low/reverse torque converter clutch solenoid valve 140 delivers hydraulic fluid to the solenoid switch valve 82 via passage 144. Hydraulic fluid can be delivered to the overdrive clutch 52 via passage 150 which communicates with the manual valve 84. Hydraulic fluid can also be communicated to the second gear clutch 58 via passage 152 which communicates with the manual valve 84.

The reverse clutch 60 and overdrive clutch 52 are each provided with dribbler valves 154, 156, respectively which allow a slow pressure release from the reverse clutch 60 and overdrive clutch 52, respectively.

Hydraulic fluid is communicated to the solenoid switch valve 82 from the second gear clutch 58 and fourth gear clutch 62 via passage 202 which communicates with the three-way ball check valve 204. Hydraulic fluid is communicated to the solenoid switch valve 82 from the overdrive clutch 52 via passage 208 which communicates with passage 114. Hydraulic fluid is communicated to the solenoid switch valve 82 from the UD clutch element 46 via passage 210 which communicates with passage 108. A bypass passage 212 is provided between fluid passage 100 and fluid passage 108 which communicates with the UD clutch element 46. A bypass passage 218 is provided between fluid passage 100 and fluid passage 114 which communicates with overdrive clutch 52 through check ball 220.

The fluid passage 108 which communicates with the UD clutch element 46 is provided with an accumulator 230. The passage 114 which communicates with the overdrive clutch 52 is provided with accumulator 232. The passage 96 which communicates with the low/reverse clutch 53 is provided with an accumulator 234. The passage 120 which communicates with the second gear clutch 58 is provided with an accumulator 236, and the passage 126 which communicates with the fourth gear clutch 62 is provided with an accumulator 238.

The skilled artisan will appreciate that the present invention may be used with modifications or variations of the above described transmission and is not limited to the automatic transmission described herein.

The operation of a typical clutch element such as those described above is now discussed. For instance, In FIGS. 4 and 5, the UD clutch element 46 is shown by example for illustration. The manual valve 84 is controlled by shift lever 346 (FIG. 1) to move manual valve 84 along the different positions associated with PRND2L (park, reverse, neutral, drive, second and low). For the purpose of this schematic, the fluid circuits are the same for park and neutral as well as for second gear and low gear. As such, the neutral position is shown below park and the low is shown below the second gear position.

Figure 4:
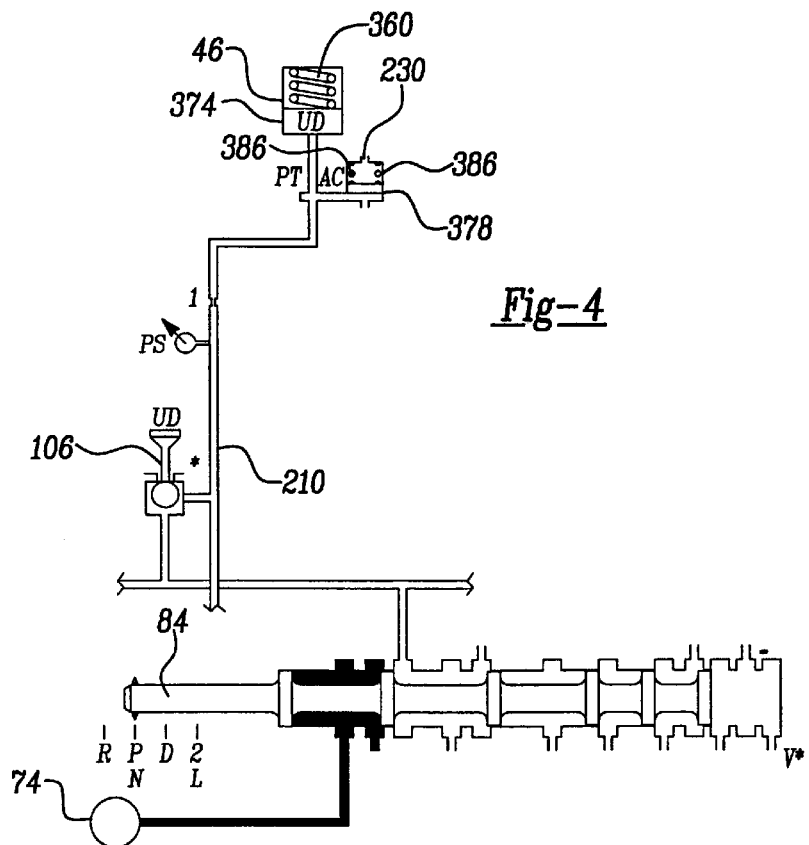
FIG. 4 is a schematic view of a fluid circuit of an automatic transmission according to the present invention.

In FIG. 4, manual valve 84 is shown positioned in park or neutral. Here, pump 74, driven by engine 312, supplies passage pressure of transmission fluid from pump 74 to manual valve 84. Since manual valve 84 is in the park or neutral position, transmission fluid is unable to pass beyond manual valve 84 and into the remainder of the fluid circuit 52 to actuate any of the corresponding clutch elements except the LR clutch.

Referring now to FIG. 5, manual valve 84 is shown positioned in the drive position. Here, fluid is able to pass from passage 370, through manual valve 84, to passage 210. Transmission fluid is pressurized up to UD solenoid valve 106. When the UD solenoid valve 106 is actuated, transmission fluid is allowed to flow past and along passage 210 until reaching piston 374 of the UD clutch element 46. Once the fluid within passage 210 reaches piston 374, electronic control system 318 operates UD solenoid valve 106 under a duty cycle. The duty cycle causes cyclical on and off operation of UD solenoid valve 106. This results in sequential allowance and disallowance of flow through UD solenoid valve 106, resulting in lower pressure of transmission fluid within passage 210 and a slow application of piston 374. Piston 374 is pressed against spring 360 until the UD clutch element 46 is fully applied. Once fully applied, piston 374 no longer moves, causing the pressure within passage 210 to increase. This increase in pressure is dampened by movement of piston 378 of accumulator 376 against spring 380.

When UD solenoid valve 106 is subsequently turned off to release the associated clutch element, bleeder holes in accumulator 230 and the remainder of passage 210 allow transmission fluid therein to bleed back to a level even with accumulator 376. However, because engine 312 continues operation of pump 74, the fluid level does not drop below this accumulator 376. As a result, the next time the UD clutch element 46 is to be actuated, the transmission fluid needs only to travel a short distance to purge air within passage 210 and is not required to traverse the entire length of passage 210.

However, when engine 312 is turned off, pump 74 does not provide pressurized fluid to passage 370, 210 or any other clutch element. As a result, transmission fluid within the fluid circuit will be drained. When the engine 312 is turned back on, pump 74 must supply fluid through the passages that drained before it can actuate UD clutch element 46.

The operation of the remainder of the clutch elements is similar to that disclosed above for the UD clutch element 46. However, it is also noted that actuation of the RC clutch element 60 causes purging of transmission fluid from the OD piston cavity. As a result, transmission fluid must be replaced in the circuits that it drained from when the OD clutch element 52 is actuated after the RC clutch element 60 is used.

It is noted that this is one example of where air may be purged. Air may be trapped in passages 370 or 210 or may also be located in a corresponding passage connection to lines 370 or 210. The present description is meant to provide one possible scenario and the application is not limited to that disclosed herein.

The operation of the present invention is now described. Typically, in automatic transmissions, air is required to be purged from the fluid circuit when shifting from neutral to first gear or from second gear to third gear. Referring now to FIG. 3A, a neutral to first gear shift (N–1) requires the UD clutch element 46 to be applied. Likewise, to undergo a second gear to third gear shift (2–3 shift) the OD clutch element 52 must be applied.

Figure 6A:
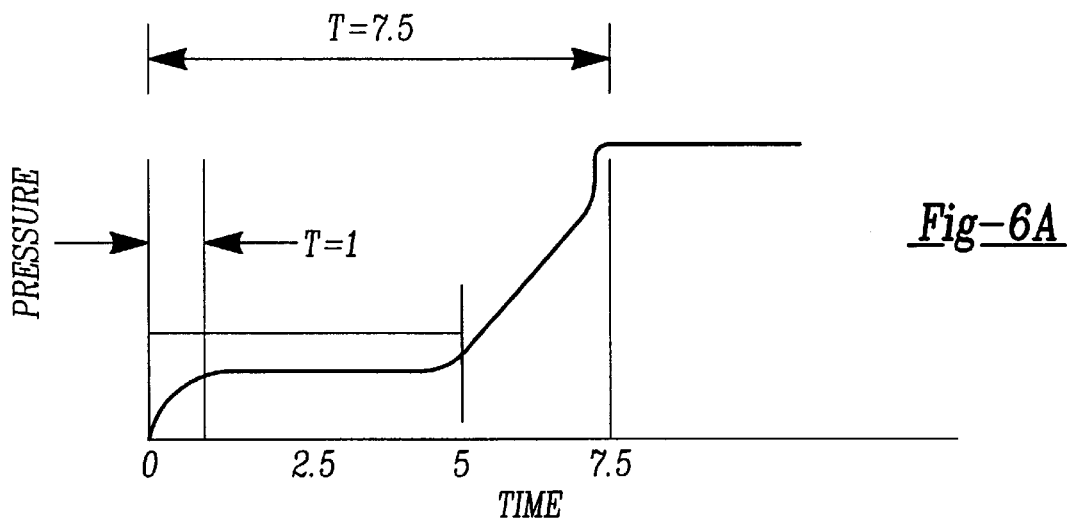
FIG. 6A is a graphical view of the operation of an automatic transmission according to the present invention.
Figure 6B:
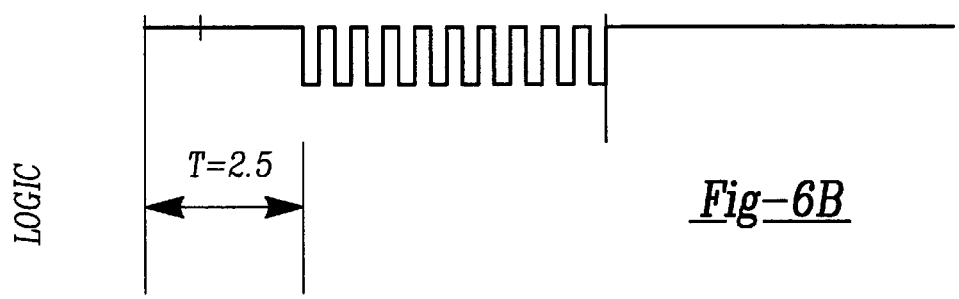
FIG. 6B is a graphical view of the operation of an automatic transmission according to the present invention.
Figure 6C:
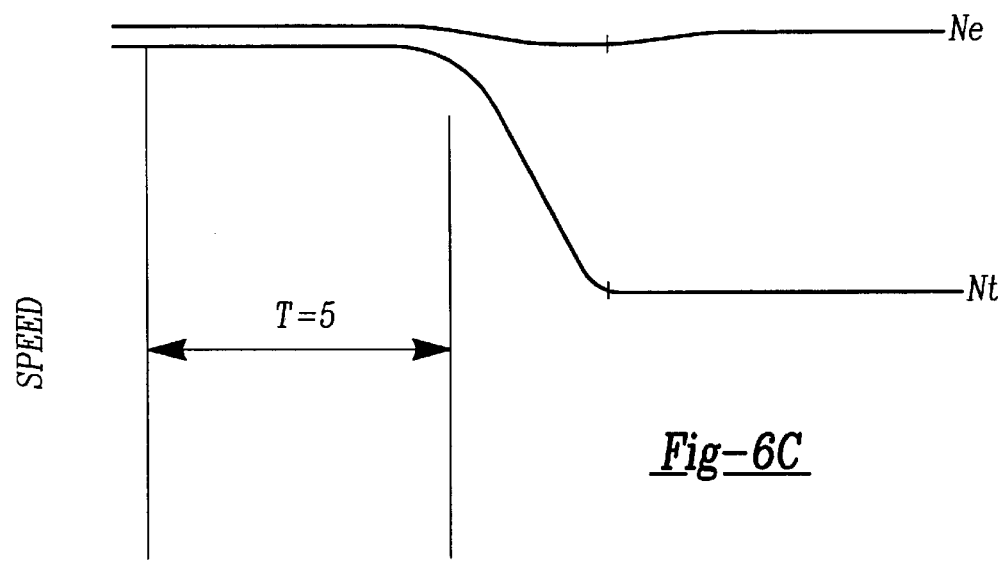
FIG. 6C is a graphical view of the operation of an automatic transmission according to the present invention.

Referring now to FIGS. 6A, 6B and 6C, the supply of fluid to the UD clutch element 46, after air has been purged therefrom, is graphically depicted. In FIG. 6A, the pressure of transmission fluid within UD clutch element 46, and the remainder of the fluid circuit between UD clutch element 46 and solenoid valve 106 is charted against time. Next, in FIG. 6B, the logical condition of UD solenoid valve 106 is plotted according to time. Below this graph, in FIG. 6C, the variation between the turbine speed (Nt) as reported by turbine speed sensor 330 and the engine speed (Ne) as reported by engine speed sensor 334 is shown as a function of time (for reasons which will be discussed).

In FIG. 6A, the UD clutch solenoid valve 106 is turned on by electronic control system 318 at time=0 and left balistically on until time=2.5 units. At time=2.5 units, the UD clutch solenoid valve 106 undergoes a duty cycle as shown in FIG. 6B. At time=5 units, the turbine speed (Nt) begins to vary from the engine speed (Ne) as is shown in FIG. 6C and the pressure begins to increase as shown in FIG. 6A. This indicates frictional engagement of the UD clutch element 46. At time=7.5 units the UD clutch element 46 is fully engaged.

Figure 7A:
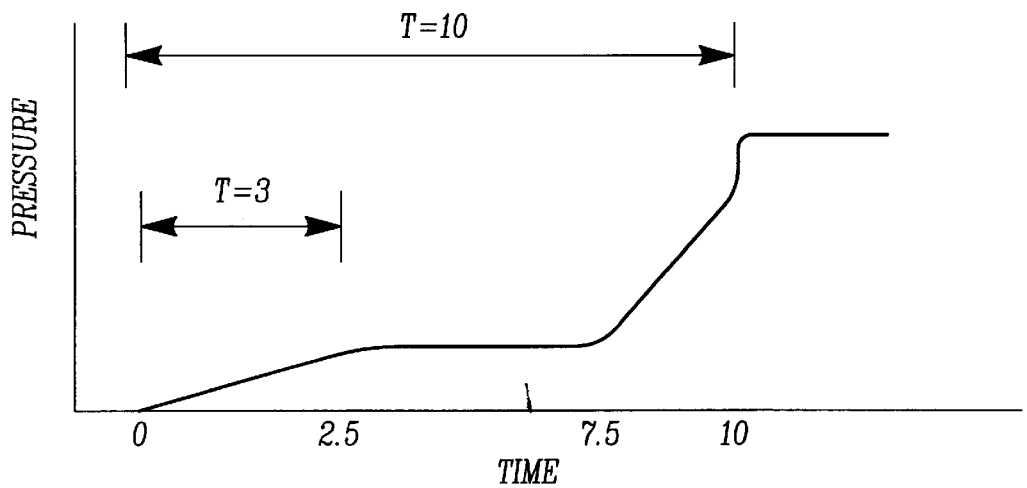
FIG. 7A is a graphical view of the operation of an automatic transmission according to the prior art.
Figure 7B:
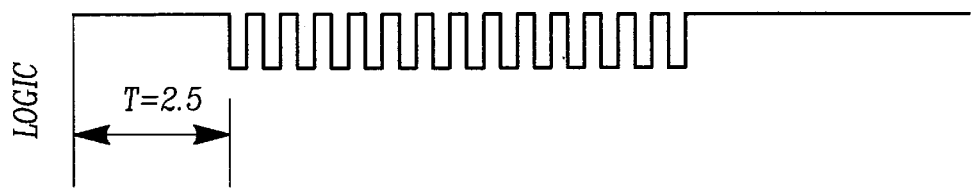
FIG. 7B is a graphical view of the operation of an automatic transmission according to the prior art.
Figure 7C:
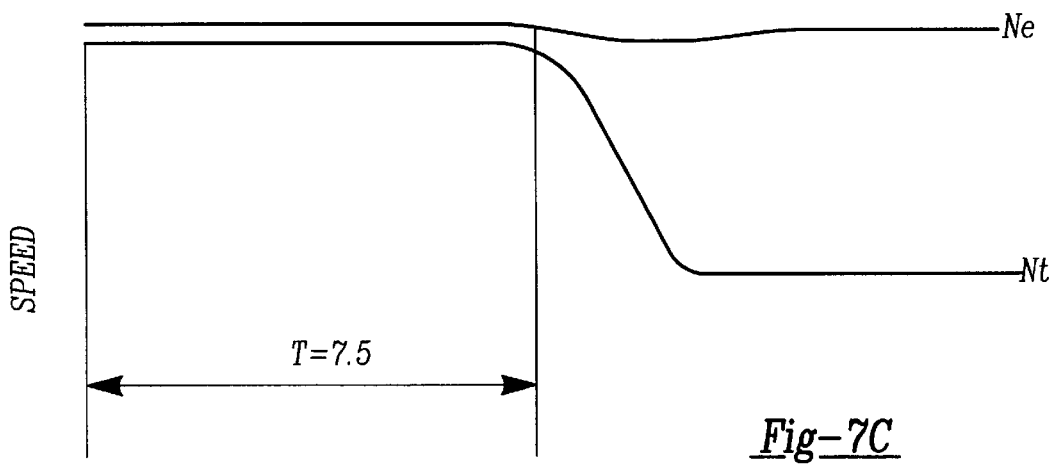
FIG. 7C is a graphical view of the operation of an automatic transmission according to the prior art.

Referring now to FIGS. 7A, 7B and 7C, a second situation is illustrated where air must be purged from the fluid circuit between UD clutch element 46 and UD solenoid valve 106 before engagement of the UD clutch element 46. Here, as before, the UD clutch solenoid valve 106 is left balistically on for a period of 2.5 units. Afterwards, the UD clutch solenoid valve 106 undergoes a duty cycle. However, unlike before, the transmission fluid must purge air from the fluid circuit between UD clutch element 46 and UD solenoid valve 106 while undergoing the duty cycle. As a result, the UD clutch element 46 does not begin application until time=7.5 units. Between time=7.5 and 10 units, the UD clutch element 46 is applied.

Figure 8A:
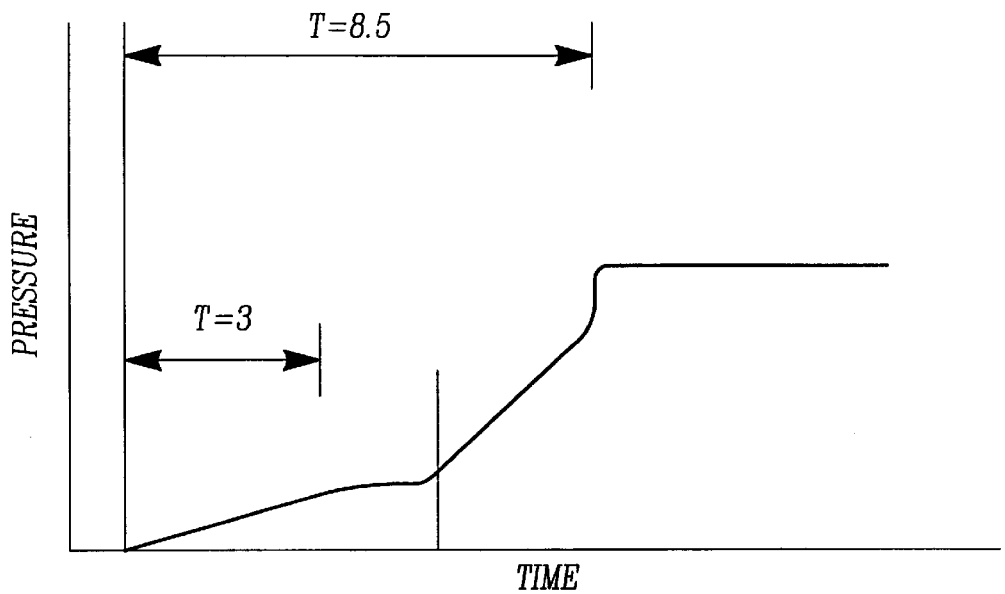
FIG. 8A is a graphical view of the operation of an automatic transmission according to the present invention.
Figure 8B:
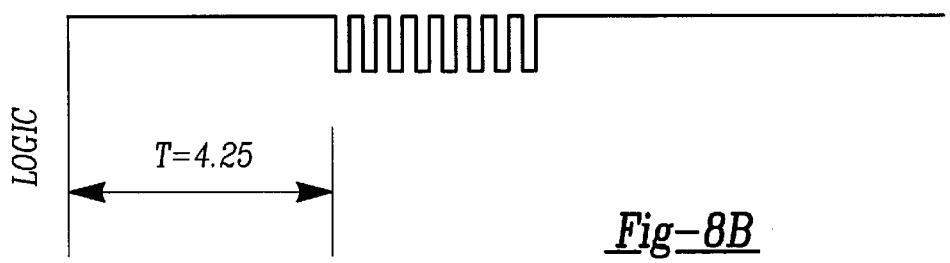
FIG. 8B is a graphical view of the operation of an automatic transmission using a learn sequence according to the present invention.
Figure 8C:
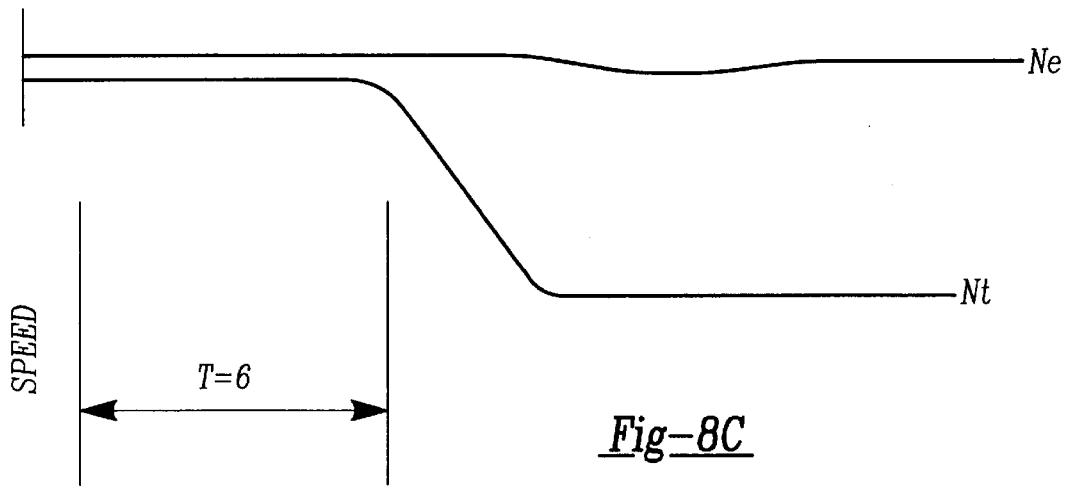
FIG. 8C is a graphical view of the operation of an automatic transmission according to the present invention.

Referring now to FIGS. 8A, 8B and 8C, the UD clutch element 46 is applied where air must be purged from the fluid circuit between UD clutch element 46 and UD solenoid valve 106 and under the principles of the present invention. Here, the UD clutch solenoid valve 106 is balistically left on for a period of 4.5 units. This time frame acts to purge much of the air with the hydraulic circuits before the duty cycle is executed. As a result, UD clutch element 46 begins application at time=6 units. UD clutch element 46 is fully applied at time=8.5 units, requiring 1.5 units less than that disclosed in FIGS. 7A, 7B and 7C.

Figure 9:
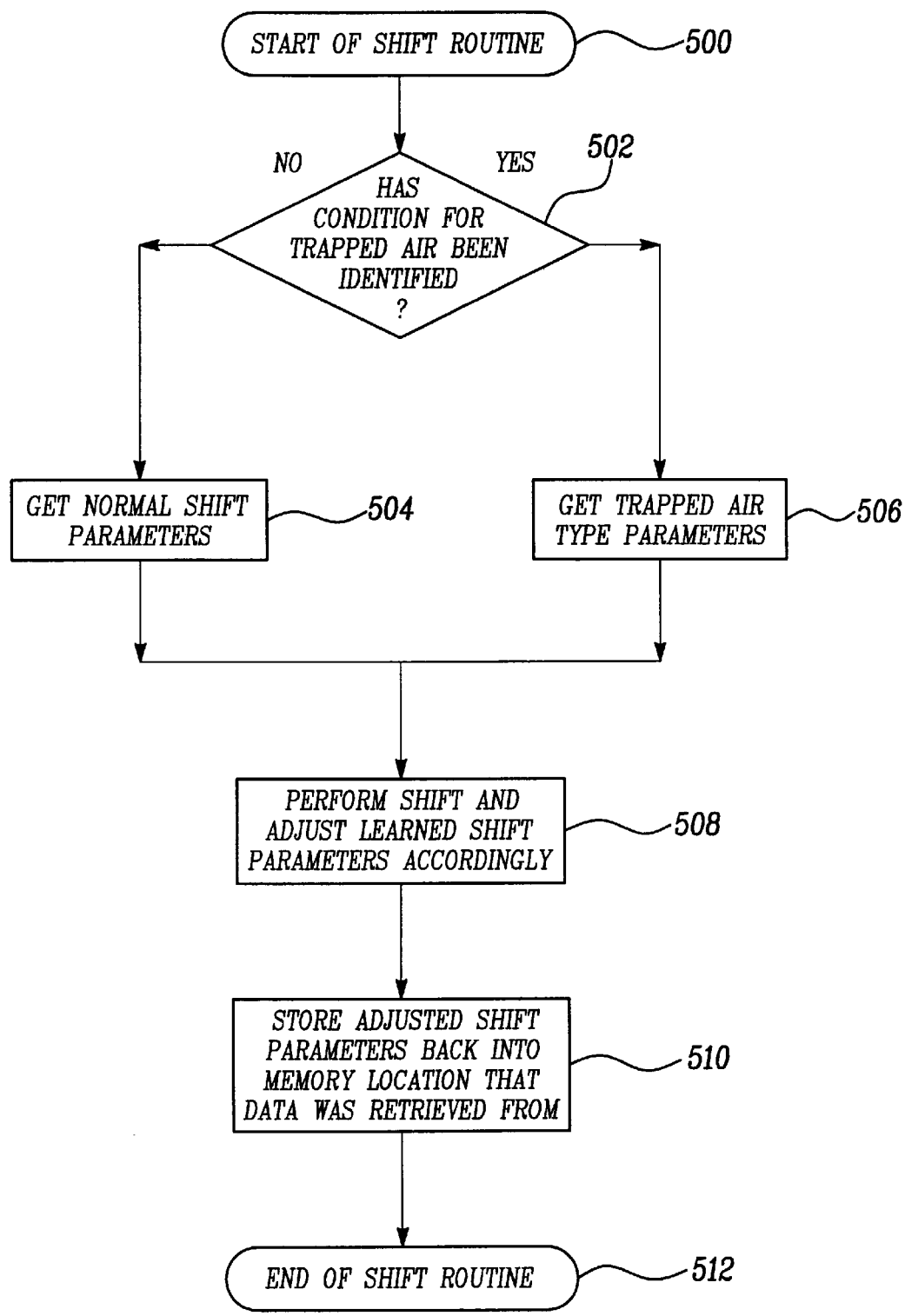
FIG. 9 is a block diagram depicting the operation of an automatic transmission according to the present invention.
Figure 10:
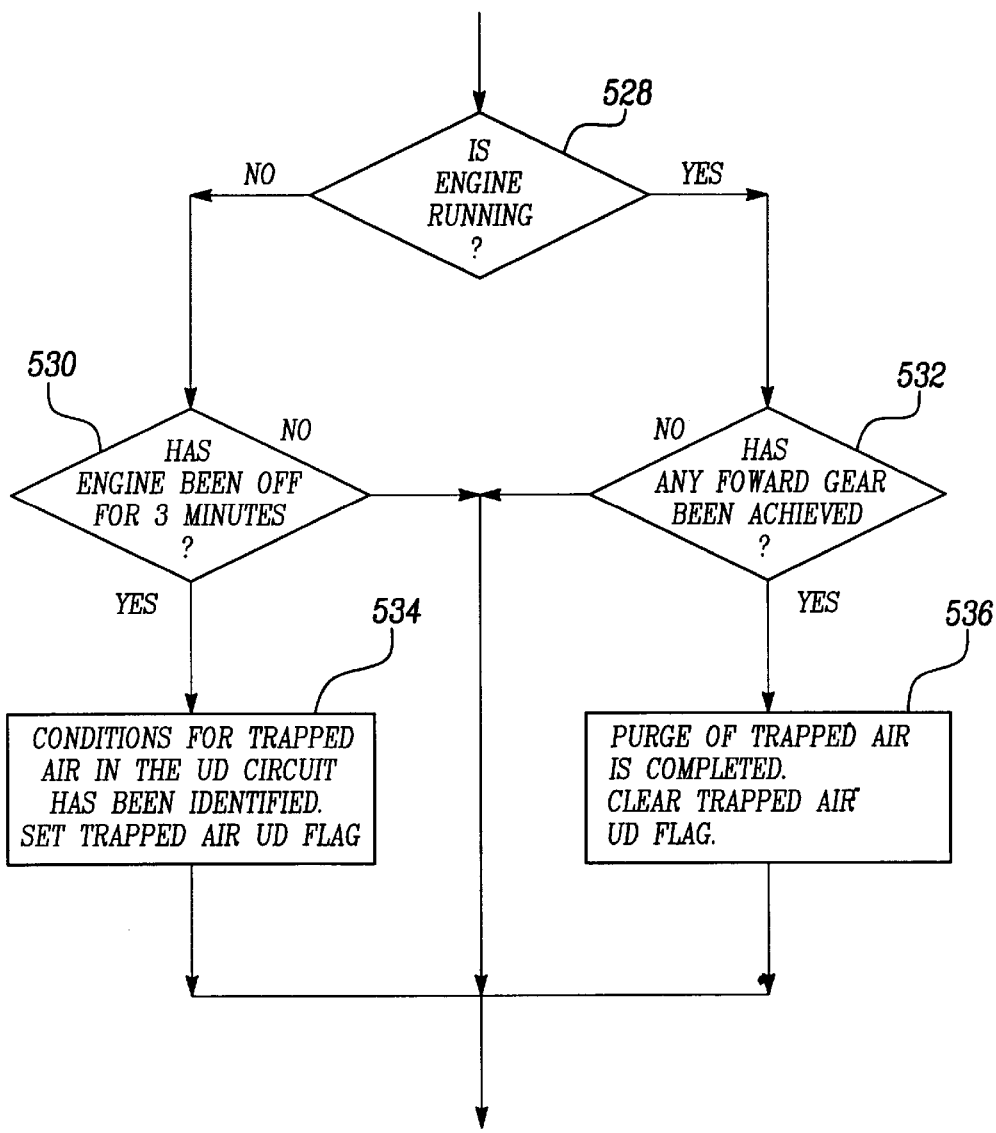
FIG. 10 is a block diagram depicting the operation of an automatic transmission according to the present invention.
Figure 11:
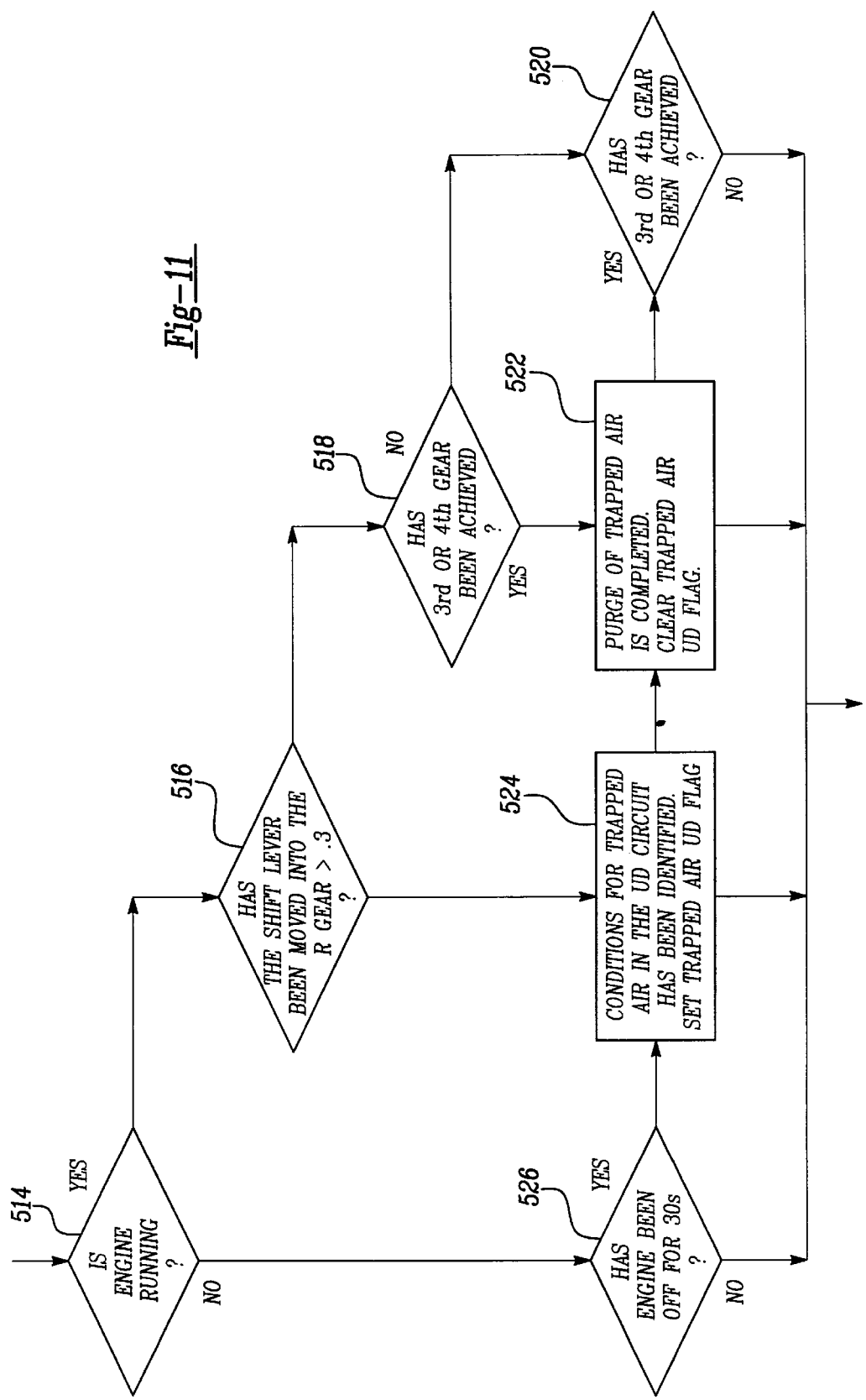
FIG. 11 is a block diagram depicting the operation of an automatic transmission according to the present invention.

Referring now to FIGS. 9, 10 and 11, the software logic contained within electronic control system 318 governing the operation of the present invention is shown in block diagram format and described. In FIG. 9, the software logic starts at block 500. The logic is initiated by electronic control system 318 when the system determines that transmission 312 is to undergo a N–1 or a 2–3 shift. From here, the program moves to block 502 and determines whether any conditions for air trapped in passages leading to the UD clutch element 46 or OD clutch element 52. If air exists in any of these passages, then electronic control system 318 sets a trapped air flag. This flag causes block 506 to use trapped air time parameters when determining the amount of time to leave the UD clutch solenoid valve 106 in a ballistic mode to purge air as shown in FIGS. 8A, 8B and 8C. If this condition is not true (and no trapped air flag set), and then block 504 is used to operate the UD clutch solenoid valve 106 in ballistic mode for a period of time corresponding to FIGS. 6A, 6B and 6C. From block 504, the electronic control system 318 moves to block 508 and uses the variation between the turbine speed and engine speed to update the parameters accordingly. Such a method for determining these parameters is disclosed in U.S. Pat. No. 5,456,647, entitled A End of Line Volume Learn sequence of Friction Element Fill Volumes For Automatic Transmission, issued on Oct. 10, 1995 to Holbrook. This patent is owned by the Assignee of the present application and is herein incorporated by reference. In Block 510, the electronic control system then stores the updated parameters.

Referring now to FIGS. 10 and 11, the logic for determining whether conditions for trapped air exist air in the passages for a N–1 and a 2–3 shift respectively is shown and described. It is noted that although air may be purged for one either the N–1 shift or the 2–3 shift, this does not correspond to purging of air for the other shift. As such, two separate sets of logic are required to determine if conditions for trapped air exist for each respective shift.

Referring now to FIG. 10, the program starts at decision block 528 to determine whether air exists from the fluid circuit between UD clutch element 46 and UD solenoid valve 106 or fluid circuit between LR clutch element 53 and manual valve 84 for the n–1 shift. In block 528, electronic control system 318 determines whether the engine is running. If the engine has not been running, then electronic control system 318 moves to block 530 to determine whether the engine has been off for 3 or more minutes. If this is true, then the transmission pump 74 most likely has not supplied sufficient pressure to maintain the fluid level within the corresponding circuits in a non-purged state. As a result, the program moves to block 534 and sets a trapped air flag.

If the engine has not been off for a period of 3 minutes, then this routine or logic continues with whatever which existed before block 530. As such, if a trapped air flag has been previously set, then the program outputs the trapped air flag. Likewise, if the trapped air flag has been cleared, then that is what the program outputs.

If the engine is running in block 528, then electronic control system 318 moves to block 532. Here, the program determines whether any forward gear has been achieved. If this condition is true, then any air within the fluid circuit between UD clutch element 46 and UD solenoid valve 106 has been purged. As such, the logic moves to block 536 to clear the trapped air flag.

If the trapped air flag is set, then block 508 in FIG. 9 uses the trapped air flag corresponding to the situation depicted in FIGS. 8A, 8B, and 8C. Else, Block 508 uses the regular/normal parameters corresponding to the situation depicted in FIGS. 6A, 6B and 6C.

Referring now to FIG. 11, electronic control system 318 determines whether or not air exists within fluid circuit between OD solenoid valve 112 and OD clutch element 52 for a 2–3 shift. In block 514, electronic control system 318 determines whether or not the engine 312 is running. If engine 312 is not running, then the program moves to block 526. Here, electronic control system 318 determines whether or not the engine has been off for 30 seconds or more. If it has not, then electronic control system 318 exits the logic maintaining whatever flag was set prior to its execution. If engine 312 been off for a period of 30 seconds or more, then electronic control system 318 moves to block 524. Here, trapped air conditions in the OD circuit have been identified. As such, the trapped air flag is set in block 524.

If the engine 312 is running, then electronic control system 318 moves to block 516. Here, the program determines whether or not reverse clutch has been actuated for greater than 0.3 seconds. If this is true, then as discussed above, the hydraulic circuit corresponding to the OD clutch element 52 has air entrapped therein. As such, electronic control system 318 moves to block 524 and sets the trap air flag. If this condition is not true, then electronic control system 318 moves to block 518 and determines whether or not third or fourth gear has been achieved. If this condition is true, then any air existing within fluid circuit between OD solenoid valve 112 and OD clutch element 52 has been purged. As such, by virtue of block 522, the trapped air flag is cleared. If third or fourth gear has not been achieved, then the program moves to block 520 to determine whether or not an end of line test as disclosed in U.S. Pat. No. 5,456,647 has been performed. If this is true, then by virtue of the test, any air entrapped within passage 114 has been purged. If this condition is not true, then the program exits with the same flag condition as existed before the logic was executed.

While the above detailed description describes the preferred embodiment of the invention, it should be understood that the present invention is susceptible to modification, variation, and alteration without deviating from the scope and fair meaning of following claims.

What is claimed is:

1. A method for adjusting the time of a ballistic flowrate of fluid to a clutch element in an automatic transmission to purge air, said method comprising:
   a. providing an automatic transmission having a fluid pump and a torque converter, said fluid pump being operationally engaged with said torque converter, said torque converter adapted to be operationally engaged with an engine, said torque converter containing a turbine;
   b. detecting a condition which can cause the need to purge air in a clutch element located within said automatic transmission;
   c. balistically supplying transmission fluid for a predetermined period of time to said clutch element through a passage to purge air within said clutch element and said passage;
   d. applying said clutch element under a duty cycle to fully apply said clutch element to achieve a designated gear state.

2. The method as claimed in claim 1, wherein said gear state is first gear, application of said clutch element causing said automatic transmission to transition from a neutral gear to said first gear.

3. The method as claimed in claim 2, wherein said purge air condition is set by determining whether said automatic transmission is being shifted into said gear state for a first time after said engine has been in an off condition for a predetermined off time.

4. The method as claimed in claim 2, wherein said purge air condition is cleared by determining whether said automatic transmission has been shifted into a forward gear before step c.

5. The method as claimed in claim 3, wherein said predetermined off time is 30 seconds.

6. The method as claimed in claim 2, wherein said clutch element is a UD clutch element.

7. The method as claimed in claim 1, further comprising the step of learning a new predetermined period of time for balistically applying said clutch element, said new predetermined period of time being learned during step d.

8. The method as claimed in claim 6, wherein said new predetermined period of time is learned by sensing when a speed of said turbine varies from a speed of said engine.

9. The method as claimed in claim 1, wherein said gear state is third gear, application of said clutch element causing said automatic transmission to transition from a second gear to said third gear.

10. The method as claimed in claim 9, wherein said clutch element is an OD clutch element.

11. The method as claimed in claim 9, wherein said purge air condition is set if said automatic transmission is being shifted into said gear state for a first time after said engine has been in an off condition for a predetermined off time.

12. The method as claimed in claim 9, wherein said purge air condition is set if said automatic transmission is being shifted into said gear state after said automatic transmission has been shifted into a reverse gear for a predetermined time.

13. The method as claimed in claim 9, wherein said purge air condition is cleared if a member of the set consisting of third and fourth gear has been achieved before step c.

14. A method for adjusting the time of a ballistic flowrate of fluid to a clutch element in an automatic transmission to purge air, said method comprising:
   a. providing an automatic transmission having a fluid pump and a torque converter, said fluid pump being operationally engaged with said torque converter, said torque converter adapted to be operationally engaged with an engine, said torque converter containing a turbine;
   b. detecting a condition which can cause the need to purge air in a clutch element located within said automatic transmission;
   c. implementing a control strategy to purge air within said clutch element and said passage.

* * * * *